3,428,568
CATION EXCHANGE PROCESS
Robert I. Harker, State College, Pa., and Joseph P. Pellicane, Jr., Bound Brook, N.J., assignors to Johns-Manville Corporation, New York, N.Y., a corporation of New York
No Drawing. Filed Dec. 18, 1963, Ser. No. 331,375
U.S. Cl. 252—301.1     12 Claims
Int. Cl. C02c 1/44

This invention relates to a novel and unique cation exchange material and method of employing same, and more particularly to the new use of a mineral material as a cation exchange medium.

The art has produced many ion exchange materials or media of natural and synthetic origin and of widely diversified compositions and characteristics as exemplified by the familiar zeolites, sulfonated carbonaceous materials such as coal, and the more recent synthetic resin based products, among numerous others. Nevertheless, such known materials are not infrequently wanting in one or more aspects or too costly, or both, for some applications whereby there remains requirements or needs to be more effectively and/or more economically met or fulfilled by new materials or products of some unique or improved attribute or property including reduced costs. This invention is concerned with a new ion exchange material of a distinctive and useful form which has particularly advantageous exchange characteristics and comprises a relatively low cost mineral.

It is accordingly a primary object of this invention to provide a new and advantageous use for a known mineral material.

It is also a primary object of this invention to provide a low cost mineral having cation exchange properties of a relatively high capacity in its natural state and unique and advantageous physical and cation exchange properties.

It is a further object of this invention to provide an economical cation exchange material which is fibrous in form or structure in its natural state and which can be felted into paper-like ion exchange membranes or sheets.

It is a further object of this invention to provide an effective and economical means or cation exchange material for the removal of long life radioactive cations from radiation contaminated waters.

It is a still further object of this invention to provide means of enhancing the cation exchange capacity of the novel ion exchange mineral of this invention.

These and other objects and advantages will be more apparent from the hereinafter detailed description.

The present invention is founded in the discovery of the useful and advantageous natural cation exchange properties of the mineral loughlinite and of the application or utilization and improvement of the cation exchange properties of this mineral. In general, this invention comprises a new use of the said mineral loughlinite and a novel method or means of carrying out or effecting useful and economical cation exchange processes.

The ion exchange material or medium of this invention—the mineral loughlinite—consists of a hydrous sodium magnesium silicate having the approximate composition $Na_2O \cdot 3MgO \cdot 6SiO_2 \cdot 8H_2O$. This mineral is a pearly white fibrous material having an asbestos-like appearance and semihard fiber consistency, and is fully described and identified by Fahey, Ross and Axelrod (1960), "Loughlinite, a New Hydrous Sodium Magnesium Silicate," The American Mineralogist, volume 45, pages 270–281. Fahey et al. assigned a refractive index value of 1.525 to this mineral, whereas material employed in the following examples exhibited a refractive index of 1.504±0.004. It has been found, however, that the refractive index of loughlinite can be raised somewhat by leaching or weathering of the mineral whereby it appears that the instant material may have been fresher than the sample of Fahey et al. For instance, the refractive index of a sample of the instant material was raised from 1.504 to 1.518 after four weeks of leaching with water. Moreover, the total water content of 19.2% of the instant mineral compares very well with the Fahey et al. figure of 20.5%.

The loughlinite material employed herein occurred as a cross vein fiber in small (maximum of about 1 cm.) parallel and sub-parallel veins in a reddish, fissile, dolomitic shale along with several other well developed carbonates of calcium and sodium. It was found that the crude loughlinite bearing ore could be processed or refined by means of conventional asbestos milling and fiberizing techniques or processes and apparatus, and in turn graded according to the standard Quebec classification, and the fiber readily separated from the mother rock, fissile, dolomitic shale, etc. Preliminary examinations indicated that the conventionally milled fiber contained considerable amounts, up to about 10% of organic material associated therewith but solvent extraction analyses established that the organic content was probably associated with the dolomitic shale rather than the fibrous loughlinite. Although this mineral resembled asbestos in appearance or is likewise fibrous in structure and could be refined or milled in a like manner, loughlinite has few if any other properties or characteristics analogous or common with asbestos.

Typical chemical analyses of two distinct but representative samples of loughlinite employed in the hereinafter examples comprise:

CHEMICAL ANALYSIS OF THE MINERAL LOUGHLINITE
[In percent]

|  | Sample A | Sample B |
| --- | --- | --- |
| Moisture loss at 105° C | | 11.0 |
| Ignition loss at 800° F | 17.9 | 7.5 |
| Additional loss at 1,000° F | 3.8 | 0.67 |
| Additional loss at 1,800° F | | 3.7 |
| Total ignition loss at 1,800° F | 27.0 | 22.87 |
| $SiO_2$ | 40.5 | 46.3 |
| $Fe_2O_3$ | 1.8 | 4.8 |
| FeO | | 2.0 |
| $TiO_2$ | 0.08 | 0.14 |
| $P_2O_5$ | 0.04 | |
| $Al_2O_3$ | 1.1 | 1.7 |
| CaO | 5.5 | 2.5 |
| MgO | 12.3 | 12.4 |
| $Na_2O$ | 9.6 | 6.8 |
| $K_2O$ | 0.74 | 0.18 |
| | 98.66 | 99.69 |

Additional sundry properties of the mineral loughlinite are:

| | |
| --- | --- |
| Particle shape | Truly fibrous like chrysotile asbestos. |
| Specific gravity | 2.2[1]. |
| Optics | $\gamma = 1.504$ and is parallel to fiber axis. |
| Bulk density | Between approximately 4.1 and 7.9. |
| Surface area | 54–59 m²/gm. |
| Water absorption | 240%. |
| Oil absorption | 276%. |
| Moisture content 105° C. | 16.4% on very pure hand-picked material. |
| TAPPI brightness | 61.6. |
| Visual efficiency | 71.0. |
| Tint factor | 15.3. |
| pH of aqueous slurry | 10.7. |

[1] Fahey, Ross and Axelrod, supra.

The relatively high cation exchange capacities of the loughlinite mineral set forth hereinafter coupled with its fibrous form renders this material unique as a cation exchange medium and when considering the relatively low cost of producing the fibrous mineral it presents a product or means of effecting cation exchange processes which are novel, useful, advantageous, and economical, among other attributes.

The cation exchange capacity of the natural loughlinite fibrous material, upon physical separation and recovery from the mother rock, shale, etc. from the crude ore, was found to be around 80 milliequivalents per 100 grams as determined by the standard ammonium acetate batch method of Reference Clay Minerals, A.P.I., Research Project 49, "Base Exchange Data," pages 91–124, July 1950, D. L. Lewis, for determining the base exchange capacity of clay minerals. Moreover, natural or untreated loughlinite was found to have a capacity for capturing and exchanging cesium, strontium and calcium from one normal solution in amounts equivalent to 130, 170 and 250 milliequivalents per 100 grams, respectively. In a 0.1 normal calcium chloride solution, natural loughlinite has a regenerable capacity of over 100 milliliters per 100 grams, and as a water softener it rated a capacity of at least 5 killigrains per cubic foot.

The following comprises specific illustrations or examples of the cation exchange properties and/or capacities of the natural mineral loughlinite and of the treated mineral setting forth means or techniques of carrying out the invention, and demonstrates the utility and pronounced effects of the cation exchange properties and capabilities of the mineral. It should be understood that the techniques or processes and conditions and results employed or referred to are merely exemplary and are not to be construed as limiting the invention to any particular data recited therein.

In the following examples the loughlinite was prepared from the crude ore by crushing the mother rock, passing the crushed ore through an entoleter, vacuum separating the fiber from the grit and rock and opening the same by rototapping, and in some instances air cleaning the resulting separated fibers.

The cation exchange properties of the mineral were investigated under a variety of conditions as set forth in the hereinafter examples.

Example I

A 5 gram sample of refined and opened loughlinite fiber was placed in 400 milliliters of three normal ammonium acetate solution and the slurry thoroughly broken up for two minutes in a Waring Blendor to provide a consistency which would permit stirring by tumbling in screw cap jars according to the procedure of Lewis in Reference Clay Mineral, A.P.I., Research Project 49, supra. As specified in this test, every day for three days the sample was filtered and recharged with fresh ammonium acetate solution and upon completion of the contact treatment the loughlinite fiber was sepaarted from the solution, washed until acetate free, and then analyzed for ammonium ions. Cation exchange capacity was thus ascertained as 84 milliequivalents per 100 grams for ammonium cations according to this procedure.

Example II

The ion exchange capacity of longhlinite for calcium, cesium and strontium in a high solids-to-liquid ratio was determined along with parallel runs with a standard montmorillonite clay from Clay Spur, Wyo., having a stated cation exchange capacity of 99 milliequivalents per gram by the standard ammonium acetate method. One gram samples of the loughlinite and the montmorillonite clay stand and were each contacted one week with 5 milliliters of one normal calcium chloride solution, one normal strontium chloride slution, and one normal cesium chloride solution, respectively, and the liquid phase removed and analyzed. The resulting cation exchange capacities of the loughlinite were 259 milliequivalents per 100 grams for calcium, 172 for strontium, and 130 for cesium, whereas the corresponding capacities for the montmorillonite clay standard were 35 milliequivalents per 100 grams for calcium, 47 for strontium, and 130 for cesium.

Example III

The ion exchange properties of loughlinite were further evaluated by comparing the same with a common commercial cation exchange synthetic zeolite material comprising a precipitated gel-type sodium-magnesium hydrated silicate marketed by a leading producer of ion exchange and water softener products. Like runs comprising contacting 1 gram samples of the sodium charged, commercial synthetic zeolite standard and loughlinite with 5 milliliters of one normal calcium chloride solution and one normal magnesium sulfate solution for three days and analyzing the solutions gave cation exchange capacities for the commercial synthetic zeolite of 142 milliequivalents per 100 grams for calcium, and 103 milliequivalents per 100 grams for magnesium, whereas the capacity of the loughlinite was 256 milliequivalents per 100 grams for calcium and 195 milliequivalents per 100 grams for magnesium. A further test under identical conditions employing loughlinite which had been heat treated to 485° C. for two hours resulted in raising the exchange capacity of the mineral to 261 and 298 milliequivalents per 100 grams for calcium and magnesium, respectively.

Example IV

Further comparative tests with the commercial synthetic zeolite employed in Example III were carried out with air cleaned loughlinite fiber heat treated for two hours at 485° C. All samples were first shaken one hour in an 18% sodium chloride solution to dissolve any very soluble salts in the loughlinite and to bring all samples to the same sodium ion regenerated condition. Each sample of 3 grams of loughlinite and the commercial zeolite was shaken for 24 hours in 150 milliliters of 0.1 normal calcium chloride solution or of 0.1 normal magnesium sulfate solution. The resulting capacity of the loughlinite was 191 milliequivalents per 100 grams for calcium and 183 milliequivalents per 100 grams for magnesium and the capacity of the commercial standard was 157 milliequivalents per 100 grams for calcium and 100 milliequivalents per 100 grams magnesium. All heat treated loughlinite samples were weighed out before being heated so that the result from the heated and unheated samples were comparable.

Example V

The relative capabilities of air cleaned loughlinite and the commercial synthetic zeolite of the foregoing examples for very dilute calcium solutions of appreciable hardness were determined as follows. Three gram samples of loughlinite and the commercial product were stirred for 24 hours in 1000 milliliters of solution containing 12 grams of calcium sulfate, and the solution analyzed. The capacity of the loughlinite was 134 milliequivalents per gram for calcium, and the capacity of the commercial zeolite cation exchange material 124 milliequivalents per gram for calcium.

Example VI

The ion exchange capacity of the heat treated loughlinite was further evaluated by treating all loughlinite samples initially with 18% sodium chloride but with two samples being heat treated before contact with the sodium chloride and two other samples being heat treated subsequent to the sodium chloride treatment. All heat treatments comprised exposure to 485° C. for two hours. The order of the treatment did not effect the amount of calcium subsequently removed from 12 grain water but heating before treatment with sodium chloride gave a somewhat higher initial apparent exchange for magnesium. For instance, when the loughlinite samples were heat treated subsequent to soaking one hour in 18% sodium chloride, then stirred for 24 hours in 1500 milliliters of 12 gram calcium sulfate, or 12 grams of magnesium sulfate they gave a capacity of 118 milliequivalents per 100 grams for calcium and 125 milliequivalents per 100 grams for magnesium, whereas the loughlinite which was heat treated prior to the one hour soaking in 18% sodium chloride then subjected to an identical cation exchange test, exhibited a capacity of 114 milliequivalents per 100 grams for calcium and 157 milliequivalents per 100 grams for magnesium.

Example VII

The ability of loughlinite to soften water under dynamic conditions was determined as follows. Samples of 3 grams of loughlinite were slurried with 200 milliliter portions of 12 grain calcium sulfate solution and poured into glass cylinders fitted with a screen at the bottom, filtered therethrough and thus formed a mat for filtering subsequent batches of water. Upon treatment by saturating with sodium chloride solution, the thus prepared fibrous filter beds, when contacted at the rate of 3.2 milliliters per minute of 12 grain calcium sulfate solution, gave average ion exchange capacities of 42 milliequivalents per 100 grams for calcium, and at a rate of 3 milliliters per minute of 12 grain calcium sulfate solution the capacity was 39 milliequivalents per 100 grams of calcium. On the basis of the volume of the filter mat, the softening capacity of loughlinite is about 5 killigrains per cubic foot.

Example VIII

The removal of a variety of cations from solution by loughlinite was determined as follows. One-tenth gram samples of loughlinite were contacted for two hours with 50 milliliters of a dilute solution (0.3–0.6 milliequivalent per 50 milliliters) of the chloride salts of potassium, cesium, calcium, magnesium, and aluminum, respectively, then each was filtered and washed. The combined filtrate of each was analyzed for the particular cation, the decrease in concentration from the original solution representing the amount removed by the loughlinite. The exchange capacity of the loughlinite for the respective cations in milliequivalents per 100 grams thereof were as follows:

| | |
|---|---|
| Potassium | 59 |
| Cesium | 205 |
| Calcium | 138 |
| Magnesium | 29 |
| Aluminum | [1] 327 |

[1] This value is not considered to represent the true ion exchange capacity since a large part of the removal of aluminum appears to be due to precipitation of hydrous aluminum oxides.

As demonstrated in the foregoing examples, the natural mineral loughlinite contains sodium available for cation exchange and the natural exchange capacity can be increased artifically. For example, heating the mineral markedly enhances the exchange capacity, i.e., about 200 to 300° C. for several hours and preferably about 460 to 530° C. for two hours, while in some cases leaching of the mineral and extending the surface area upgrades its cation exchange capacity, possibly due to enabling greater access to internal sodium ions.

Although natural or the treated forms of loughlinite in general do not exhibit as great a cation exchange capacity as the costly high exchange capacity synthetic resin based exchange materials, or even the sulfonated carbonaceous products, they do equal or better many of the commonly employed ion exchange products. And the fibrous nature of this mineral whereby it can function as a mechanical filling medium as well as ion exchange material and can be fabricated into a paper, membrane and the like filter mat or felt, among other advantageous forms, its high capacity for cesium and exchange capacity for strontium, and low cost, provide a unique and economical cation exchange material which has many useful and advantageous characteristics.

It will be understood that the foregoing details are given for purposes of illustration, not restriction, and that the variations within the spirit of this invention are intended to be included within the scope of the appended claims.

We claim:

1. The method of removing radioactive cations from radiation contaminated aqueous media comprising intimately contacting the radiation contaminated aqueous media containing radioactive cations with a cation exchange medium consisting essentially of mineral loughlinite.

2. The method of removing radioactive cations from radiation contaminated aqueous media comprising intimately contacting the radiation contaminated aqueous media containing radioactive cations with a cation exchange medium consisting essentially of mineral loughlinite containing a disproportionately high concentration of cations exchangeable for the radioactive cations to be removed from the contaminated aqueous media.

3. The method of claim 2 wherein the radioactive cations comprise at least one member selected from the group consisting of cesium and strontium.

4. The method of removing cations from aqueous media comprising intimately contacting the aqueous media containing the cations with mineral loughlinite.

5. The method of removing cations from aqueous media comprising intimately contacting the aqueous media containing the cations with mineral loughlinite containing a disproportionately high concentration of exchangeable cations unlike the cations to be removed from the aqueous media.

6. The method of claim 5 wherein the mineral loughlinite is pretreated by heating to a temperature of at least about 200° F. to enhance its cation exchange properties.

7. The method of removing cations of at least one member of the group consisting of cesium, strontium, calcium, potassium, aluminum and ammonium from water comprising intimately contacting the water with mineral loughlinite containing exchangeable sodium ions.

8. The method of filtering and removing cation from aqueous media comprising passing the aqueous media through a mass of fibrous mineral loughlinite.

9. The method of upgrading the cation exchange properties of mineral loughlinite comprising heating the loughlinite to a temperature of at least about 200° C. for a period of at least about 4 hours.

10. The method of upgrading the cation exchange properties of mineral loughlinite comprising heating the loughlinite to a temperature of about 460 to 530° C. for a period of approximately 2 hours.

11. A cation exchange material consisting essentially of the product of heat treating mineral loughlinite at a temperature of at least about 200° F.

12. A cation exchange material consisting essentially of the product of heat treating mineral loughlinite at about 460 to 530° C. for approximately 2 hours.

References Cited

Fahey et al.: The American Mineralogist, vol. 45, March-April 1960, pp. 270–281.

SAMIH N. ZAHARNA, *Primary Examiner.*

E. G. WHITBY, *Assistant Examiner.*

U.S. Cl. X.R.

23—111; 210—38; 252—179, 454, 457; 260—2.2